United States Patent
Hong et al.

(10) Patent No.: US 7,330,593 B2
(45) Date of Patent: Feb. 12, 2008

(54) SEGMENT BASED IMAGE MATCHING METHOD AND SYSTEM

(75) Inventors: Li Hong, San Diego, CA (US); George-Qian Chen, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 754 days.

(21) Appl. No.: 10/876,950

(22) Filed: Jun. 25, 2004

(65) Prior Publication Data
US 2005/0286756 A1   Dec. 29, 2005

(51) Int. Cl.
*G06K 9/62* (2006.01)

(52) U.S. Cl. .................. 382/209; 382/171; 382/173; 382/180

(58) Field of Classification Search ............. 33/317 D; 382/171, 173, 180, 209
See application file for complete search history.

(56) References Cited

OTHER PUBLICATIONS

Li Hong and George Chen, Segment-based Stereo Matching Using Graph Cuts, Jul. 2004, Advanced System Technology San Diego Lab, STMicroelecn-onics, Inc.*
Vladimir Kolmogorov and Ramin Zabih, Computing Visual Correspondence with Occlusions via Graph Cuts,Jul. 7, 2001, Computer Science Department Cornell University.*
Tao, H., et al., "A Global Matching Framework for Stereo Computation," Proceedings Eighth IEEE International Conference on Computer Vision, vol. 1, Jul. 7, 2001, pp. 532-539, XP002392831.
Kolmogorov, V., et al., "Computing Visual Correspondence with Occlusions Using Graph Cuts," Proceedings of the Eighth IEEE International Conference on Computer Vision. (ICCV), Vancouver, British Columbia, Canada, Jul. 7-14, 2001. International Conference on Computer Vision, Los Alamitos, CA: IEEE Comp. Soc., US, vol. 1 of 2, Conf. 8, Jul. 7, 2001, pp. 508-515, XP010554131; ISBN: 0-7695-1143-0.
Boykov, Y., et al., "Fast Approximate Energy Minimization Via Graph Cuts," IEEE Transactions on Pattern Analysis and Machine Intelligence, IEEE Service Center, Los Alamitos, CA, US, vol. 11, No. 23, Nov. 2001, pp. 1222-1239, XP001141302; ISSN: 0162-8828.
Hong, L., et al., "Segment-Based Stereo Matching Using Graph Cuts," Computer Vision and Pattern Recognition, 2004; CVPR 2004; Proceedings of the 2004 IEEE Computer Society Conference on Washington, DC, USA; Jun. 27-Jul. 2, 2004; Piscataway, NJ, USA, IEEE; vol. 1, Jun. 27, 2004, pp. 74-81, XP010708991; ISBN: 0-7695-2158-4.

(Continued)

*Primary Examiner*—Matthew C. Bella
*Assistant Examiner*—G. F. Cunningham
(74) *Attorney, Agent, or Firm*—Lisa K. Jorgenson; Stephen Bongini

(57) ABSTRACT

An image matching method and system for use with multiple images of a scene captured from different angles. Image matching is performed by identifying a plurality of segments within at least two images, determining an initial disparity values for pixels in the images and then determining initial disparity planes for the segments by fitting a plane to initial disparity values for the segments. A refined disparity plane set is created by iteratively refitting the disparity planes by using various fitting cost functions and weighted linear systems. A labeling of each segment to a disparity plane is made by minimizing a global energy function that includes energy terms for segment to disparity plane matching as well as penalizing disparity plane discontinuities between adjacent image segments.

30 Claims, 8 Drawing Sheets

OTHER PUBLICATIONS

Bleyer, M., et al., "A Layered Stereo Matching Algorithm Using Image Segmentation and Global Visibility Constraints," ISPRS Journal of Photogrammetry and Remote Sensing, XX, XX, vol. 59, No. 3, May 2005, pp. 128-150, XP004903846, ISSN: 0924-2716.
European Search Report for Application No. EP05253466 dated Jul. 31, 2006.
S. Birchfield and C. Tomasi, "Multiway Cut for Stereo and Motion with Slanted Surfaces," *Proc. Int'l Conf. Computer Vision*, pp. 489-495, Sep. 1999.
Y. Boykov, O. Veksler, and R. Zabih, "Fast Approximate Energy Minimization via Graph Cuts," *IEEE Trans. Pattern Analysis and Machine Intelligence*, 23(11), Nov. 2001.
D. Comaniciu and P. Meer, "Robust Analysis of Feature Spaces: Color Image Segmentation," *Proc. IEEE Conf. Computer Vision and Pattern Recognition*, pp. 750-755, 1997.
J. Y. Goulermas and P. Liatsis, "A Collective-based Adaptive Symbiotic Model for Surface Reconstruction in Areabased Stereo," *IEEE Trans. Evolutionary Computation*, vol. 7(5), pp. 482-502, 2003.
M. Lin and C. Tomasi, "Surfaces with Occlusions from Layered Stereo," Ph.D thesis, Stanford University 2002.
H.Mayer, "Analysis of Means to Improve Cooperative Disparity Estimation," *ISPRS Conf. Photogrammetric Image Analysis*, 2003.
D. Scharstein and R. Szeliski, "Stereo Matching with Nonlinear Diffusion," *Int'l J. Computer Vision*, vol. 28, No. 2, pp. 155-174, 1998.
D. Scharstein and R. Szeliski, "A Taxonomy and Evaluation of Dense Two-Frame Stereo Correspondence Algorithms," *Int'l J. Computer Vision*, vol. 47, No. 1, pp. 7-42, 2002.
J. Sun, N. N. Zheng and H. Y. Shum, "Stereo Matching Using Belief Propagation," *IEEE Trans. Pattern Analysis and Machine Intelligence*, vol. 25, No. 7, Jul. 2003.
H. Tao, H. S. Sawhney and R. Kumar, "A Global Matching Framework for Stereo Computation," *Proc. Int'l Conf. Computer Vision* 2001.
V. Kolmogorov and R. Zabih, "Computing Visual Correspondence with Occlusions using Graph Cuts," *Proc. Int'l Conf. Computer Vision* 2001.
V. Kolmogorov and R. Zabih, "What Energy Functions can be Minimized via Graph Cuts?" *Proc. European Conf. Computer Vision* 2002.
V. Kolmogorov and R. Zabih, "Multi-Camera Scene Reconstruction via Graph Cuts," *Proc. European Conf. Computer Vision* 2002.
O. Veksler, "Efficient Graph-based Energy Minimization Methods in Computer Vision", PhD thesis, Cornell University, Jul. 1999.
O. Veksler, "Fast Variable Window for Stereo Correspondence Using Integral Images," *Proc. Int'l Conf. Computer Vision and Pattern Recognition*, 2003.
C. L. Zitnick and T. Kanade, "A Cooperative Algorithm for StereoMatching and Occlusion Detection," *IEEE Trans. Pattern Analysis and Machine Intelligence*, 22(7), pp. 675-684, 2000.
H. Tao et al., "Global Matching Criterion and Color Segmentation Based Stereo", Sarnoff Corporation, Princeton NJ, pp. 108, 2000.

\* cited by examiner

SEGMENT BASED IMAGE MATCHING METHOD AND SYSTEM

FIELD OF THE INVENTION

The present invention generally relates to automated image processing and more particularly to determining three dimensional information from sets of images.

BACKGROUND OF THE INVENTION

There are many applications for determining three-dimensional object information from pairs or sets of two-dimensional images that each capture a particular scene from different angles. Stereo image matching is a type of such processing that has a goal of determining a disparity map between image pairs that are taken of the same scene. Due to its ill-posed nature, the major challenges of stereo matching involve finding the correct disparity for pixels that are within areas of: (1) textureless regions, (2) depth discontinuous boundaries and (3) occluded portions of the images. These challenges reduce the robustness of information determined by these stereo image matching techniques, and reduce the usability of the three-dimensional data they produce.

Therefore a need exists to overcome the problems with the prior art as discussed above.

SUMMARY OF THE INVENTION

In accordance with an exemplary embodiment of the present invention, a method for image matching includes determining a first disparity surface within a disparity surface set by fitting initial disparity values for at least three pixels that are contained within a first segment of a plurality of segments within an image and determining a second disparity surface within the disparity surface set by fitting initial disparity values for at least three pixels that are contained within a second segment within the plurality of segments of the image. The method also includes iterative steps to refine the initial planes so as to form a disparity surface set. The method further includes fitting each segment within the plurality of segments to a respective best fit disparity surface within the disparity surface set by minimizing a labeling efficiency function that determines labeling efficiency for each segment with respect to each disparity surface within the disparity surface set.

In accordance with another aspect of the present invention, an image matching system has a disparity calculator that determines a first disparity surface within a disparity surface set by fitting initial disparity values for at least three pixels that are contained within a first segment of a plurality of segments within an image and that also determines a second disparity surface of the disparity surface set by fitting initial disparity values for at least three pixels that are contained within a second segment within the plurality of segments of the image. The image matching system also includes iterative steps to refine the initial planes so as to form a disparity surface set. The image matching system further has a best fit processor that fits each of the plurality of segments within the image to a respective best fit disparity surface within the disparity surface set by minimizing a labeling efficiency function that globally determines labeling efficiency for each segment with respect to each disparity surface within the disparity surface set.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

As required, detailed embodiments of the present invention are disclosed herein; however, it is to be understood that the disclosed embodiments are merely exemplary of the invention, which can be embodied in various forms as described in the non-limiting exemplary embodiments. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
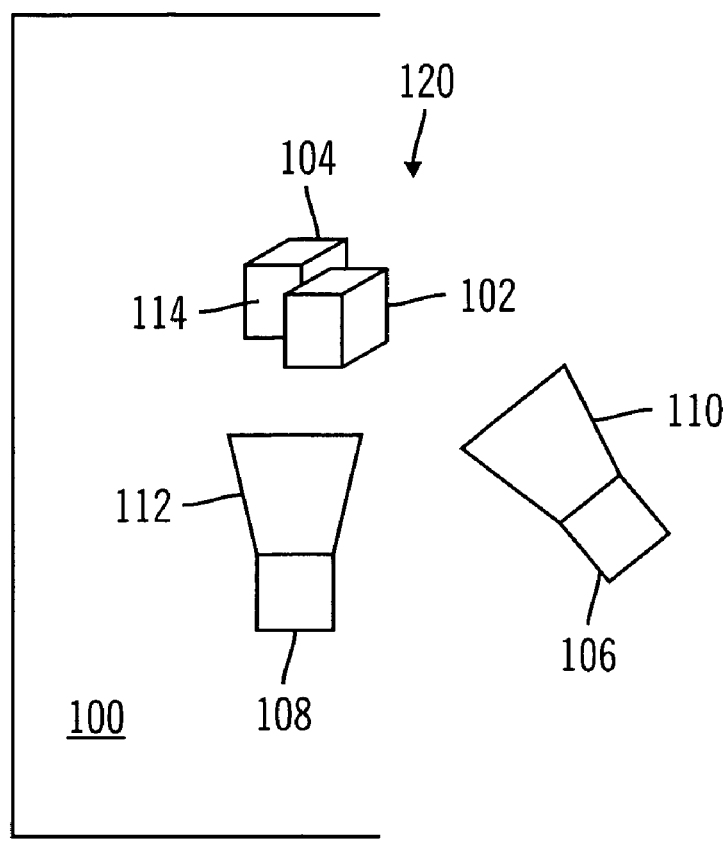
FIG. 1 illustrates a scene capturing configuration according to an exemplary embodiment of the present invention.

FIG. 1 illustrates a scene capturing configuration 100 according to an exemplary embodiment of the present invention. The scene capturing configuration includes a scene 120, which consists of two cubes, a first cube 102 and a second cube 104, in this example. This exemplary scene capturing configuration 100 further includes two cameras, a first camera 106 and a second camera 108. Each of the two cameras of the exemplary embodiment has a respective field of view. The first camera 106 has a first field of view 110 and the second camera 108 has a second field of view 112. Due to the physical positioning of the objects within the exemplary scene capturing configuration 100, the second cube 104 has a partially occluded face 114. As viewed from the position of the two cameras (i.e., camera 1 106 and camera 2 108) part of the occluded face 114 of the second cube 104 is blocked by the first cube 102. As illustrated, more of the occluded face 114 is blocked for the first field of view 110 as seen by camera 1 106 than is blocked for the second field of view 112. Such occlusions present difficulties in determining depth information.

Although the exemplary scene capturing configuration 100 includes only two cameras, further embodiments include multiple cameras that capture images of scene 120 from additional points of view. The cameras of the exemplary scene capturing configuration 100 produce digital images for further processing, as described below. Further embodiments of the present invention operate with cameras or other image capturing apparatuses that do not produce digital images themselves, or that produce digital and other forms of image data.

Figure 2:
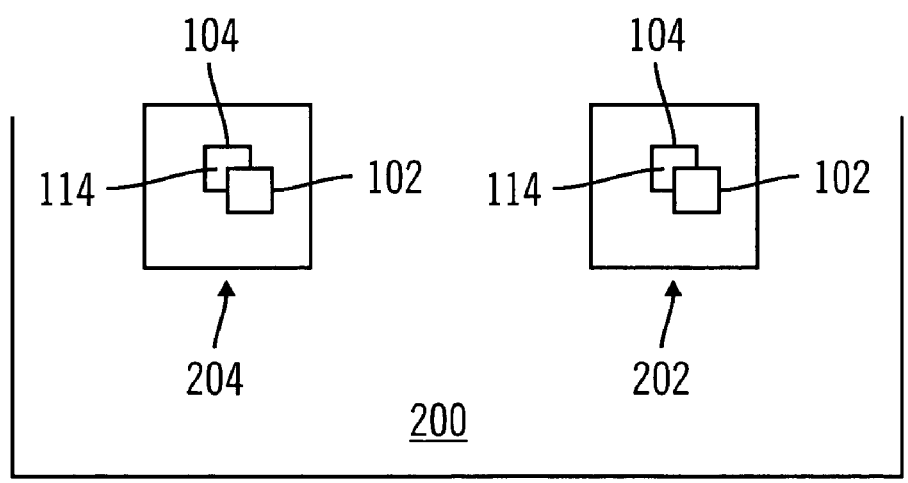
FIG. 2 illustrates an exemplary pair of two-dimensional images captured by the scene capturing configuration illustrated in FIG. 1.

FIG. 2 illustrates an exemplary pair of two-dimensional images 200 that are captured by cameras in the scene capturing configuration 100. A first image 202 is captured by camera 1 106 and a second image 204 is captured by camera 2 108. In the operation of the exemplary embodiment of the present invention, one of these images, such as the first image 202, is chosen as a reference image. Shown in these two images are the two cubes, cube 1 102 and cube 2 104. The occluded face 114 is further shown in the two images as being less blocked in image 2 204 than it is in image 1 202.

Figure 3:
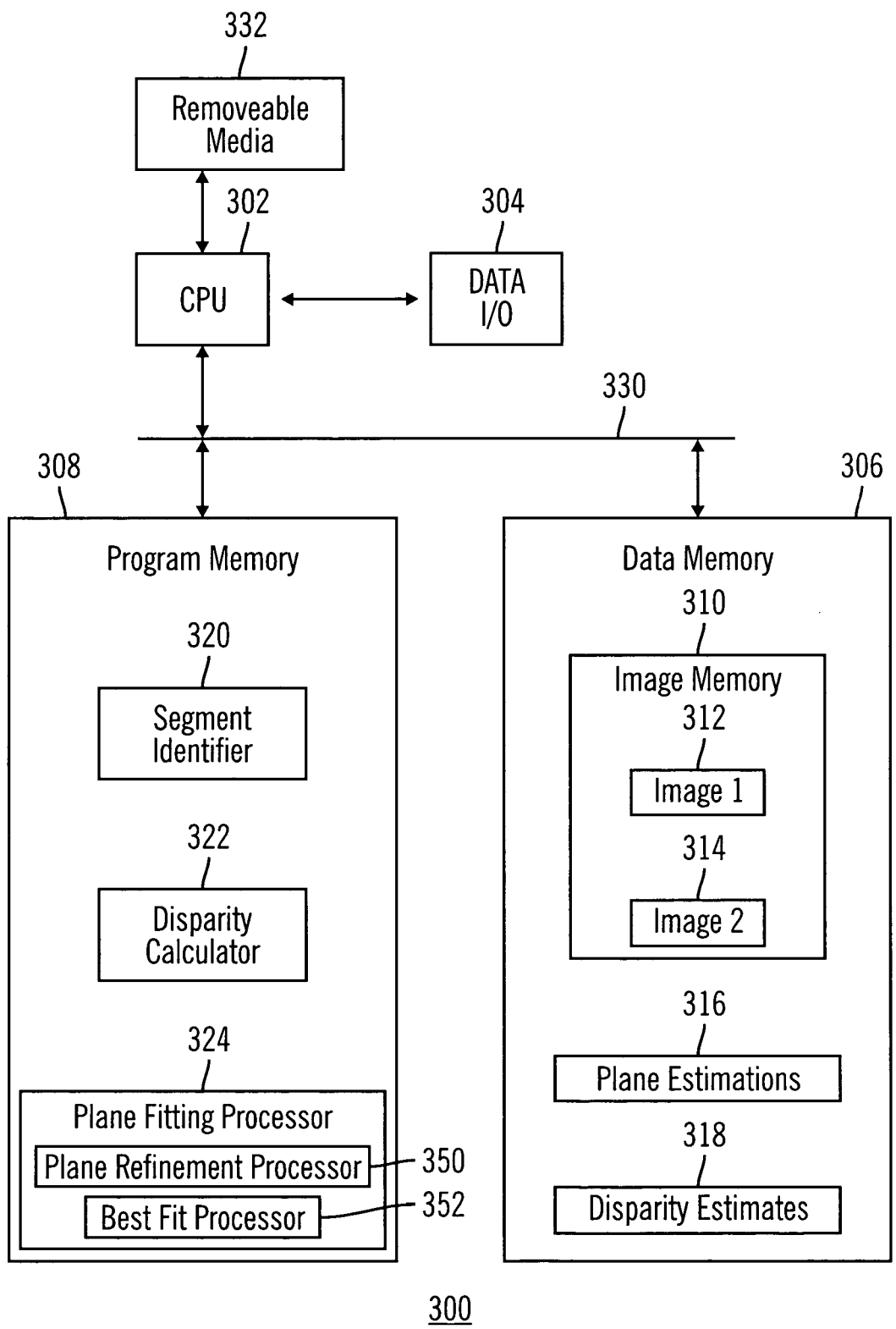
FIG. 3 is a block diagram for an image processing system according to an exemplary embodiment of the present invention.

FIG. 3 is a block diagram for an image processing system 300 according to an exemplary embodiment of the present invention. This exemplary image processing system 300 is a specialized digital processing system. The image processing system 300 includes a Central Processing Unit (CPU) 302. The CPU 302 of the exemplary embodiment includes a programmable processor as well as specifically constructed digital processing units optimized to rapidly perform highly repetitive processing tasks required by this exemplary embodiment. Further embodiments of the present invention include distributed digital and/or image processing units that are fully or partially programmable and/or configured to perform fixed processing functions.

The image processing system 300 of the exemplary embodiment includes a removable media device 332 to allow a computer program product to be provided to the image processing system in order to support the operations described herein. The exemplary image processing system 300 further has a data Input/Output (I/O) port 304 to allow exchange of digital data. The data I/O port 304 is used, for example, to receive digitized captured image data and to send disparity plane information.

The components within the image processing system 300 communicate via a data bus 330. Data bus 330 of the exemplary embodiment is a high speed internal data bus. Further embodiments expand the data bus 330 to include operation of image processing systems over, for example, distributed processing systems.

The image processing system 300 of the exemplary embodiment includes a data memory 306 that is used to store image data and intermediate processing information, as described below. Data is communicated and exchanged between the CPU 302 and the data memory 306 via data bus 330 in the exemplary embodiment. Data memory 306 has an image memory 310 that has storage for at least two images, image 1 312 and image 2 314 in this example. Data memory 306 further includes a disparity plane definitions storage 316 to store initial and refined disparity plane estimates produced by the processing of the exemplary embodiment of the present invention, as described below. The data memory 306 also has a disparity estimates storage 318 for storing estimated disparities that are calculated for pixels of images stored in the image memory 310, as described below.

The image processing system 300 of the exemplary embodiment includes a program memory 308. The program memory 308 of the exemplary embodiment contains program code that is executed by the CPU 302 to perform the processing of the present invention. Further embodiments of the present invention include dedicated processors that are configured to perform at least a portion of the processing defined by the program code contained within program memory 308. Program memory 308 communicates and exchanges data with CPU 302 via data bus 330 in the exemplary embodiment.

Program memory 308 includes a segment identifier 320 that includes programming instructions to control the processing of images stored in image memory 310, such as image 1 312 and image 2 314, to select a reference image and to then identify segments within that reference image, such as image 1 312. Embodiments of the present invention operate with any color segmentation algorithm that decomposes an image into homogenous color regions. Operation of the exemplary embodiment of the present invention has been observed to be improved by emphasizing over-segmentation as opposed to under-segmentation of the images. The exemplary embodiment of the present invention uses a mean shift color segmentation algorithm. An example of a color segmentation algorithm used in the exemplary embodiment is described in D. Comaniciu and P. Meer, "Robust Analysis of Feature Spaces: Color Image Segmentation", Proc. IEEE Conf. Computer Vision and Pattern Recognition, PP. 750-755, 1997, which is incorporated herein by reference.

Program memory 308 further includes a disparity calculator 322 that includes programming instructions to control the processing of images stored in image memory 310 to determine disparity estimates for pixels within those images, as described below. Disparity estimates produced by the disparity calculator 322 are stored in the disparity estimates storage 318. The program memory 308 also includes a disparity plane fitting processor 324 that iteratively fits disparity planes to each segment identified within a reference image that is stored in the image memory 310, as described below. Further embodiments of the present invention utilize disparity surfaces that are more complex than the flat disparity planes utilized by the exemplary embodiment. Such embodiments utilize higher order surfaces and/or spline based disparity models for disparity surfaces. These embodiments include processors to properly fit identified segments to such more complex disparity surfaces.

The disparity plane fitting processor 324 of the exemplary embodiment includes a plane refinement processor 350 that creates a refined disparity plane set by iteratively refitting disparity planes to pixels within the identified segments. The disparity plane fitting processor 324 further contains a best fit processor 352 that fits identified segments to a best fit disparity plane within the refined disparity plane set, as is described below.

The disparity calculator 322 includes an initial disparity calculator that calculates disparity values between pixels in a reference image and corresponding pixels in another view of the same scene. In the exemplary embodiment described above, the reference image is image 1 202 and the other image is image 2 204.

The processing of the exemplary embodiment of the present invention associates segments in the scene with a collection of disparity continuous surfaces. Each of these surfaces is approximated by a plane in the exemplary embodiment. Further embodiments include more sophisticated representation models, such as models with disparity surfaces that include higher order models, splines, and so forth. Although the plane approximations of the exemplary embodiment may lose some disparity accuracy, such a simple model has been found to be sufficient for many applications such as view synthesis, image based rendering, etc. The processing of the exemplary embodiment of the present invention uses the processing described herein to estimate possible disparity planes inside the scene.

Disparity plane calculation in the exemplary embodiment of the present invention begins by obtaining initial pixel disparities through local matching analysis. The processing then computes the initial disparity plane parameters for each color segment that was previously identified in the reference image. The exemplary embodiment does not process relatively small segments, which are defined to be segments that have a number of pixels below a certain, predefined threshold. As an example, in a typical image that has a size of 640×480 pixels, segments with fewer than approximately 900 pixels are not processed by the exemplary embodiment to determine disparity planes. The processing then refines the parameters of the disparity planes by fitting these disparity planes to joint segments that are conceptually created for the purpose of refining the parameters of disparity planes. This processing joins two or more neighboring segments that were determined to have similar disparity plane coefficients and treats these two or more segments as a larger, single joint segment for purposes of estimating plane parameters. These two or more image segments are not, however, otherwise combined at this stage of processing and remain separate for subsequent processing, including performing segment labeling by using graph cuts as is described below.

In a standard rectified stereo setup, the correspondence between a pixel (x, y) in a reference image I, which is image 1 202 and stored in the image memory 310 as image 1 312 in the exemplary embodiment, and a pixel (x', y') in the matching image J, which is image 2 204 and stored in the image memory 310 as image 2 314 in the exemplary embodiment, is given by: x'=x+d(x, y), y'=y, where the disparity d(x, y) can take any discrete value from the displacement interval $[d_{min}, d_{max}]$. In the following, the function c(x, y, d) denotes the matching cost (or dissimilarity) for the pixel (x, y) in image I with disparity d. In the exemplary embodiment, the function c(x, y, d) is computed as the average pixel intensity differences in a 3×3 surrounding window, as shown by the following equation.

$$c(x, y, d) = \frac{1}{9} \sum_{i=-1}^{1} \sum_{j=-1}^{1} |I(x+i, y+j) - J(x+i+d, y+j)| \quad (1)$$

Among all possible disparities for the pixel (x, y), the one that gives the minimum matching cost is selected as the initial estimated disparity $\hat{d}(x, y)$.

The processing of the exemplary embodiment next performs an initial disparity plane fitting to an identified set of segments within the reference image. A disparity plane is used to model the continuous disparity of each segment using the following equation.

$$d = c_1 x + c_2 y + c_3 \quad (2)$$

where $c_1, c_2, c_3$ are the coefficients, or parameters, of the disparity plane and d is the corresponding disparity of the image pixel (x, y). The disparity plane coefficients for the current segment are defined by the vector $(c_1, c_2, c_3)$ and are the least square solution of the following linear system.

$$A[c_1, c_2, c_3]^T = B \quad (3)$$

where the i-th row of A is given by $[x_i\ y_i\ 1]$, the i-th element in B is given by $d(x_i, y_i)$. A solution for $[c_1, c_2, c_3]^T$ is given by the following equation.

$$\begin{pmatrix} \sum_i x_i x_i & \sum_i x_i y_i & \sum_i x_i \\ \sum_i x_i y_i & \sum_i y_i y_i & \sum_i y_i \\ \sum_i x_i & \sum_i y_i & \sum_i 1 \end{pmatrix} \begin{pmatrix} c_1 \\ c_2 \\ c_3 \end{pmatrix} = \begin{pmatrix} \sum_i x_i d_i \\ \sum_i y_i d_i \\ \sum_i d_i \end{pmatrix} \quad (4)$$

After this initial disparity plane fitting, an iterative process is used to update and refine the disparity plane estimate. In each iteration, the pixel disparity is changed within a given range relative to the fitted disparity plane and the disparity plane parameters are updated based on the modified disparities accordingly.

The operation of the exemplary embodiment of the present invention introduces several techniques to enhance the robustness of the disparity plane fitting algorithm. A first technique employed by the exemplary embodiment of the present invention is based upon an observation that the solution of the linear system as defined by equation (3) can be biased by pixels with unreliable initial disparities. Such pixels are referred to herein as "outliers" or "outlying pixels". The processing of the exemplary embodiment only includes pixels with reliable initial disparity estimation to form the linear system defined by equation (3) and excludes outlying pixels. The processing of the exemplary embodiment of the present invention detects outliers through a simple crosscheck method.

As an example of the crosschecking method used by the exemplary embodiment to detect outliers, assume that the pixel (x', y') is the matching or corresponding pixel, in the corresponding image and based on the initial disparity $\hat{d}(x, y)$, to the pixel (x, y) in the reference image. The term $\hat{d}'(x', y')$ is defined as the initial disparity of pixel (x', y') in the matching image as determined by comparison to the reference image (i.e., the reference and matching or corresponding image are reversed for purposes of calculating $\hat{d}$). If $\hat{d}(x, y) \neq \hat{d}'(x', y')$, pixel (x, y) is then considered to be an outlier and is not included in the linear system equation defined by equation (3).

A second technique employed by the exemplary embodiment of the present invention adopts a linear system that includes a weighted least squares technique in subsequent iterations of the disparity plane fitting process. The disparity plane parameters are initially computed through equation (3). Subsequent iterations performed by the exemplary embodiment adjust a weight of each equation that forms the linear system in equation (3). This weight is based upon the closeness of the pixel initial disparity to the estimated disparity plane. One weighting function used by the exemplary embodiment of the present invention is given by the following equation.

$$w(\beta_i) = e^{-2\beta_i}, \text{ where } \beta_i = |c_1 x_i + c_2 y_i + c_3 - \hat{d}(x_i, y_i)|. \quad (5)$$

These weighting functions are applied to the linear system defined by equation (3) to yield a weighted linear system with a solution given below, where $w_i$ is given by $w(\beta_i)$ for point $(x_i, y_i)$.

$$\begin{pmatrix} \sum_i w_i x_i x_i & \sum_i w_i x_i y_i & \sum_i w_i x_i \\ \sum_i w_i x_i y_i & \sum_i w_i y_i y_i & \sum_i w_i y_i \\ \sum_i w_i x_i & \sum_i w_i y_i & \sum_i w_i 1 \end{pmatrix} \begin{pmatrix} c_1 \\ c_2 \\ c_3 \end{pmatrix} = \begin{pmatrix} \sum_i w_i x_i d_i \\ \sum_i w_i y_i d_i \\ \sum_i w_i d_i \end{pmatrix} \quad (6)$$

Refined disparity plane estimates are then formed by accordingly updating the disparity plane parameters, i.e., coefficients, based on these modified weights and solving the weighted linear system given by equation (3). The exemplary embodiment reiterates this process for a maximum number of iterations or until convergence is observed.

A third technique employed by the exemplary embodiment of the present invention skips very small segments based on a predefined minimum segment size. This is justified based on an observation and assumption that such small segments lack sufficient data to provide reliable disparity plane estimations.

The processing of the exemplary embodiment of the present invention further defines a composite set of disparity planes that contains the disparity planes calculated for the image being processed. A disparity plane computed for a particular segment is added into the composite disparity plane set only if no similar disparity plane already exists in the disparity plane set. Generally, the disparity plane set contains fewer disparity planes than there are identified segments in the image.

Once a composite disparity plane set is determined for a scene, the processing of the exemplary embodiment then treats neighboring image segments that are assigned to the same disparity plane as a conceptually single segment, referred to herein as a joint segment, and then operates to refine the parameters defining the disparity planes that are fitted to these larger conceptual joint segments. The purpose of this processing is not primarily focused on finding the best disparity plane for each segment, but rather on extracting all possible disparity planes for the image being processed.

The processing of the exemplary embodiment of the present invention operates to extract a set of disparity planes that accurately represent the structure of the scene being processed. This is achieved by iteratively refining the fitting of disparity planes to the joint segments. The usefulness of this processing is based upon an observation that small fragmented regions should be grouped together to provide more reliable pixels to form the linear system as defined by equation (3).

The processing of the exemplary embodiment of the present invention focuses on measuring segment matching costs for each disparity plane. This matching cost can be simply computed as the sum of the matching cost of each single pixel inside the segment using the following equation.

$$C(S, P) = \sum_{(x,y) \in S} c(x, y, d) \quad (7)$$

where S is an image segment, P is a disparity plane, and $d = c_1^P x + c_2^P y + c_3^P$, where $c_1^P$, $c_2^P$ and $c_3^P$ are the parameters of P.

Calculating the matching cost with this function can, however, lead to suboptimal results. The results of this function can be degraded because occluded pixels easily bias the matching cost, especially with segments that have a significant proportion of occluded pixels or with segments that are smooth and textureless. Nevertheless, this simpler matching cost function is sometimes determined to be sufficient and is used to simplify processing complexity for some or all image segments being processed.

The exemplary embodiment of the present invention further includes an alternative matching cost function that incorporates two refinements to improve the results over those achieved by using equation (7). A first refinement of this alternative matching cost function excludes possibly occluded pixels in computing the segment matching cost. A second refinement of this alternative matching cost function modifies the sum of pixel matching costs with a term that is related to the percentage of non-supporting pixels for the disparity plane.

Recall that outliers are pixels that have an unreliable initial disparity estimation and are detected through the crosscheck method described above. It is clear that occluded pixels are outliers under this definition. The exemplary embodiment of the present invention does not treat outliers in smooth textureless regions as occluded pixels for two reasons: (i) smooth textureless pixels tend to fail the crosscheck as a result of matching ambiguities rather than occlusion; and (ii) occlusions normally occur around object boundaries, which are highly textured.

Among the non-occluded pixels, a pixel is said to support a disparity plane if that pixel's initial estimated disparity is within a small vicinity of the value defined by that disparity plane. If the pixel's initial estimated disparity is not within this small vicinity of the disparity plane, it is not considered as a supporting pixel for that disparity plane. The processing of the exemplary embodiment determines if a pixel is a supporting pixel for a given disparity plane through use of the following equation.

$$|c_1 * x + c_2 * y + c_3 - d(x, y)| < \text{Threshold} \quad (8)$$

where:

(x, y) are the coordinates of the pixel, $c_1$, $c_2$, and $c_3$ are the coefficients for the disparity plane, and $d(x, y)$ is the initial disparity estimate for the pixel The exemplary embodiment selects a predetermined value prior to execution of this function for use as the threshold value. As an example, the exemplary embodiment sets the threshold equal to 2. Further embodiments are able to calculate predefined thresholds based upon various parameters prior to execution of this function.

Exemplary embodiments of the present invention incorporate an alternative matching cost function that is able to be used in place of the cost function described by equation (7) above. This alternative cost function incorporates both the first refinement and the second refinement discussed above. In this alternative cost function, "n" is the number of non-occluded pixels in a segment S, and "s" is the number of supporting pixels in segment S to a disparity plane P. This alternative segment matching cost function is defined as follows.

$$C(S, P) = \sum_{(x,y) \in S-O} c(x, y, d) e^{1-\frac{s}{n}} \quad (9)$$

where O represents the occluded portion in S and $d=c_1^P x + c_2^P y + c_3^P$.

There are two parts to this alternative matching cost function: (i) an accumulated sum of non-occluded pixel matching cost, and (ii) an exponential function that increases with the non-supporting pixel percentage. This alternative definition of a matching cost function favors disparity planes with low accumulated sum and large supporting size. This is especially beneficial with textureless segments. In those segments, the first part will be comparable for various disparity planes; thus favoring the disparity plane with large supporting size helps to reduce the ambiguities. For textured segments, part (i) will vary significantly between the correct disparity plane and other estimated disparity planes, and the role of part (ii) will further enlarge the cost difference as the correct disparity plane generally has a larger number of supporting pixels. Although the cost matching function given by equation (9) provides these benefits, the cost matching function given by equation (7) can be used, for example, in cases where these benefits are not judged to outweigh the additional processing cost of the alternative cost matching function of equation (9).

In the operation of the exemplary embodiment, the matching cost function is selected from this plurality of matching cost functions dependent upon a number of pixels in the segment selected for processing. The exemplary embodiment further performs this matching cost function with image segments that have a number of pixels greater than a respective predetermined threshold, which is a threshold used in respect for this matching cost function. This causes the fitting of segments to a best fit disparity plane with segments that have more pixels than this predetermined threshold.

The processing of the exemplary embodiment next labels each segment with a corresponding disparity plane by graph cuts. In the following example, R represents the color segments of the reference image and D is the estimated disparity plane set. The goal is to find a labeling $f$ that assigns each segment $S \in R$ a corresponding disparity plane $f(S) \in D$, where $f$ is both piecewise smooth and consistent with the observed data. We formulate the labeling efficiency problem as a global energy minimization problem in the segment domain, i.e., we obtain a labeling $f^*$ that minimizes a labeling efficiency or energy minimization function that determines labeling efficiency for each segment with respect to each disparity surface within the disparity surface set. The labeling efficiency function utilized by the exemplary embodiment is defined by the following equation.

$$E(f) = E_{data}(f) + E_{smooth}(f) \quad (10)$$

In the above equation, $E_{data}$ is a data-dependent energy term containing the cost of assigning disparity plane labels to the segments and is defined as follows.

$$E_{data}(f) = \sum_{S \in R} C(S, f(S)) \quad (11)$$

The function $C(S, f(S))$ in the above equation is defined by the function $C(S, P)$, as defined above by either equation (7) or equation (9) depending upon the characteristics of the particular image segment. The exemplary embodiment of the present invention uses $C(S,P)$ as defined by equation (7) for very small segments, e.g., segments that have fewer than forty (40) pixels, and uses $C(S,P)$ as defined by equation (9) for larger segments. In the case of equation (9), the determination of support pixels is described above. Further embodiments are able to select from either of these functions or from other functions based on other criteria.

The $E_{smooth}(f)$ term in equation (10), above, enforces smoothness and operates to reduce disparity plane discontinuities by penalizing such discontinuities, i.e., imposing penalties if different disparity planes are assigned to adjacent or neighboring segments. The $E_{smooth}(f)$ term is defined as follows.

$$E_{smooth}(f) = \sum_{S,S'} u_{S,S'} \delta(f(S) \neq f(S')) \quad (12)$$

where S and S' are neighboring segments, $u_{S,S'}$ is proportional to the common border length between segment S and S', and $\delta(f(S) \neq f(S'))$ has value 1 if $f(S) \neq f(S')$, otherwise 0.

After the above processing has labeled identified color segments with refined disparity planes, further processing is able to be performed to further enhance the image segmentation definition. For example, neighboring segments that are labeled so as to be associated with the same disparity plane can be combined into a larger segment that is associated with the same disparity surface. This processing advantageously allows a patterned surface, such as a checkered wall, to be combined into a single image segment associated with a single disparity plane. Such a combination advantageously increases the robustness of image disparity processing.

FIGS. 4 through 9 illustrate processing flow diagrams that describe the processing performed by an exemplary embodiment of the present invention. The processing flows described in FIGS. 4 through 9 illustrate exemplary processing to implement the image processing described above.

Figure 4:
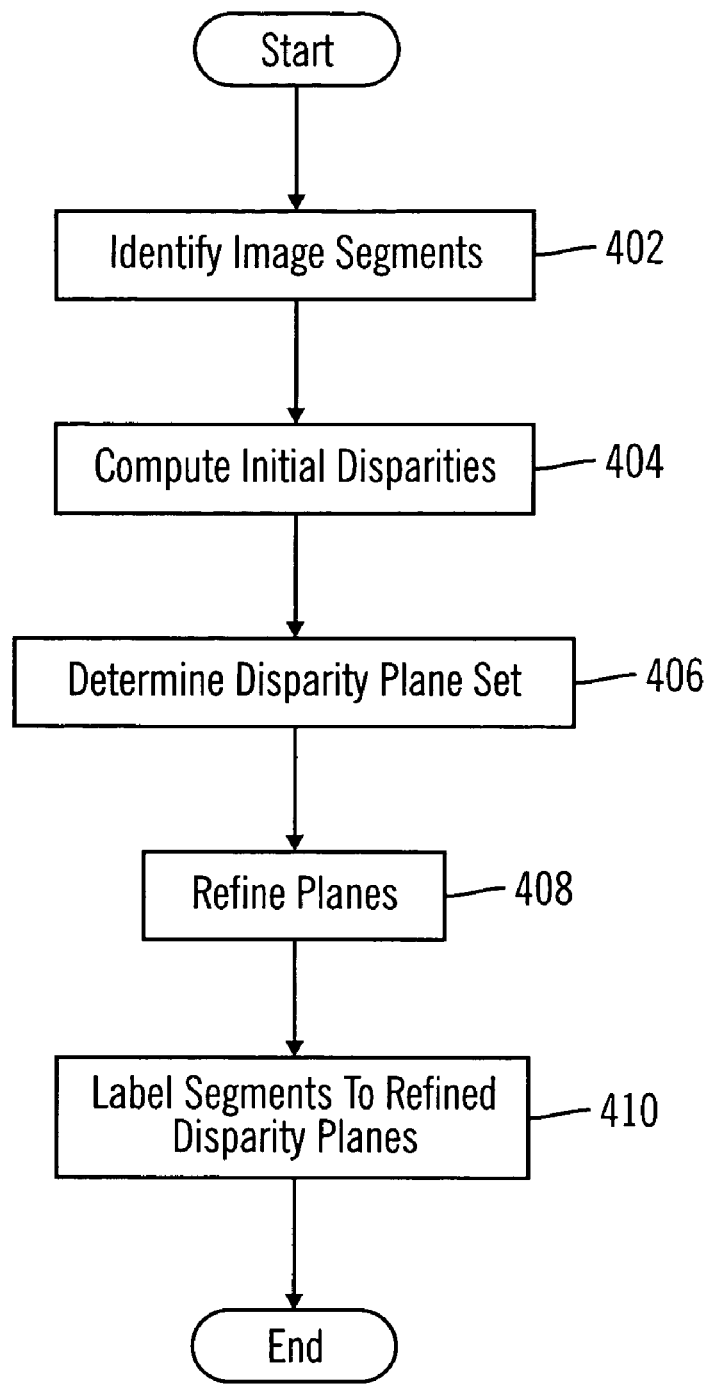
FIG. 4 is a processing flow diagram for a top level image processing as performed by an exemplary embodiment of the present invention.

FIG. 4 is a processing flow diagram for a top level image processing 400 as performed by an exemplary embodiment of the present invention. The top level image processing 400 is performed in the exemplary embodiment by the image processing system 300 for two or more images that each contain at least a part of a common scene and that have been captured and stored therein, as described above. The top level image processing 400 begins by identifying, at step 402, the segments within a reference image from among the images stored in the image memory 310. Segments are identified in the exemplary embodiment by the segment identifier module 320.

After segments have been identified, the top level processing 400 continues by determining, at step 404, initial disparities for pixels within each identified segment. Disparities for each pixel are determined in the exemplary embodiment according to the techniques described above and the processing described below. The processing of the exemplary embodiment then determines, at step 406, a disparity plane set that contains disparity planes that best fit the segments that were identified within the reference image. The processing then refines, at step 408, the disparity planes by iterative refinement processing. The processing then labels, at step 410, the identified segments by assigning each identified color segment to a refined disparity plane. The exemplary embodiment labels, i.e., assigns, each identified color segment to a best fit disparity plane, which is the disparity plane that is determined to be a "best fit" for the identified color segment based upon the matching cost functions described above. The processing then terminates and produces a labeling for each segment within the reference image that assigns each segment to a best fit disparity plane within the refined disparity plane set.

Figure 5:
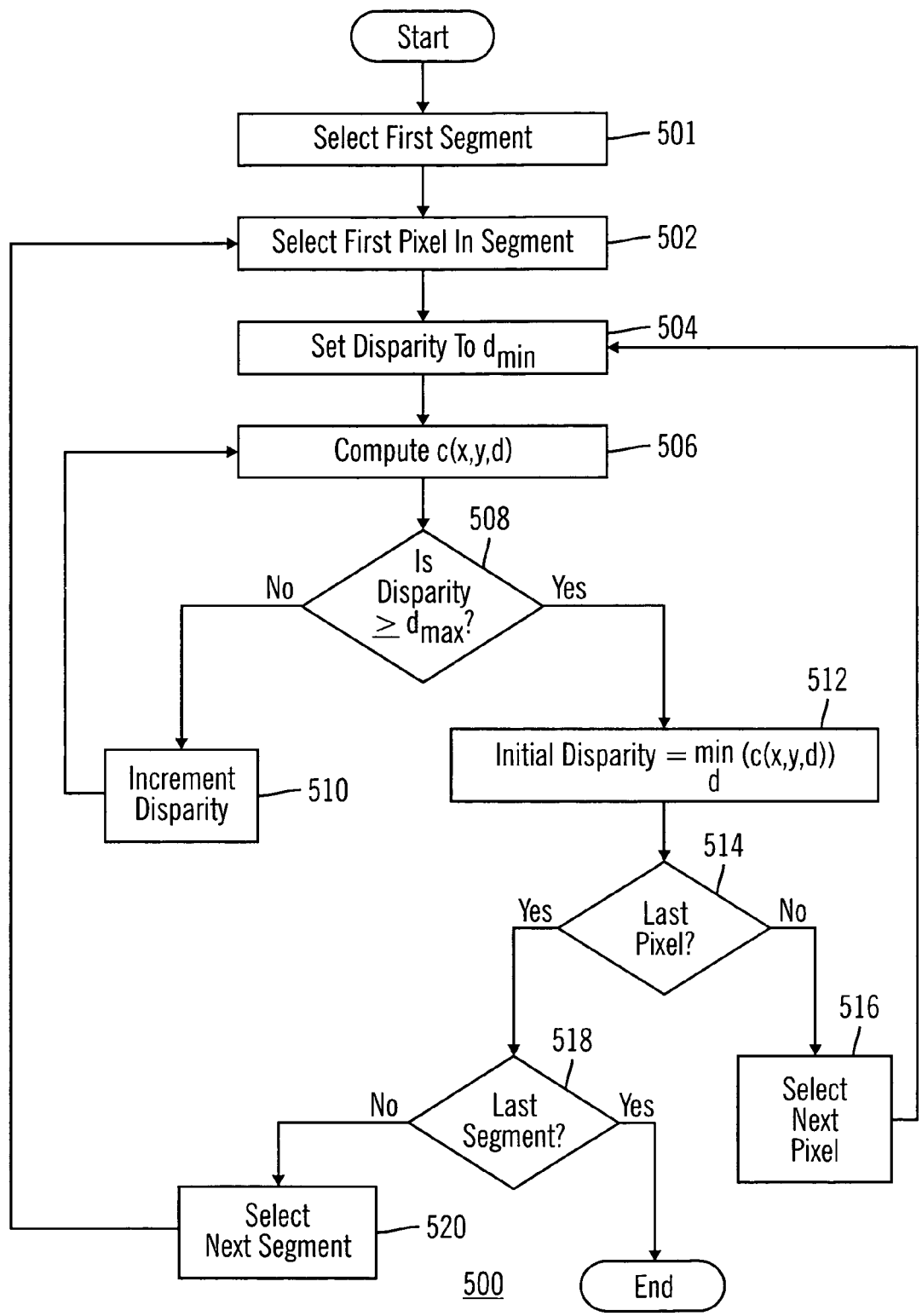
FIG. 5 illustrates a processing flow diagram for an initial disparity calculation according to an exemplary embodiment of the present invention.

FIG. 5 illustrates a processing flow diagram for an initial disparity calculation 500 according to an exemplary embodiment of the present invention. This exemplary initial disparity calculation processing flow 500 is performed after image segments are identified in the reference image, as described above. The processing of the exemplary embodiment processes each pixel for disparity values between a predetermined disparity range of $[d_{min}, d_{max}]$. The predetermined disparity range used by the exemplary embodiment is dependent upon several factors, including the size of the images being processed and any a priori or determined information about expected disparity range information. In a typical processing scenario performed by the exemplary embodiment, $d_{min}$, is generally set to 0 and $d_{max}$ is generally set to a percentage of the number of pixels in the width of the image being processed. In an exemplary processing configuration, $d_{max}$ is set to between thirty and fifty percent of the number of pixels in the width of the image being processed. The exemplary embodiment of the present invention is able to be configured to use different values of $d_{min}$ is set to and to have values of $d_{max}$ that are set to less than or greater than these numbers.

The initial disparity calculation 500 starts by selecting, at step 501, a first image segment within the identified segments for the reference image. The processing then continues by selecting, at step 502, a first pixel in the selected segment. The processing then sets, at step 504, the value of "disparity" to the predetermined value for $d_{min}$. The processing then determines the value of c(x, y, d), as is defined above, with "d" set to the value of "disparity". This processing further stores the minimum value of c(x, y, d) for each iteration. The processing then determines, at step 508, if the tested "disparity" value is greater than or equal to $d_{max}$. If the value of "disparity" is not greater than or equal to $d_{max}$, the processing increments, at step 510, the disparity value and returns to recompute, at step 506, the value c(x, y, d). This process continues until the value of "disparity" is greater than or equal to $d_{max}$, as determined at step 508. If the value of "disparity" is determined to be greater than $d_{max}$, the processing sets, at step 512, the initial disparity for this pixel to the minimum value of c(x, y, d) as was observed in the preceding loop for all iterations of "disparity".

The initial disparity calculation 500 then continues by determining, at step 514, if this is the last pixel in the selected image segment. If this is not determined to be the last pixel in the selected image segment, the processing selects, at step 516, the next pixel to process and returns to setting, at step 504, the "disparity" for this pixel to $d_{min}$. The processing then continues for this pixel as described above. If this is determined to be the last pixel in the selected image segment, the processing continues by determining, at step 518, if the selected segment is the last segment in the image to process. If the selected segment is not determined to be the last segment, the processing continues by selecting, at step 520, the next segment in the image to process. The processing then returns to selecting, at step 502, the first pixel in the currently selected image segment and continues processing this newly selected image segment as described above. If this is determined to be the last image segment to process, the initial disparity calculation 500 then terminates.

Figure 6:
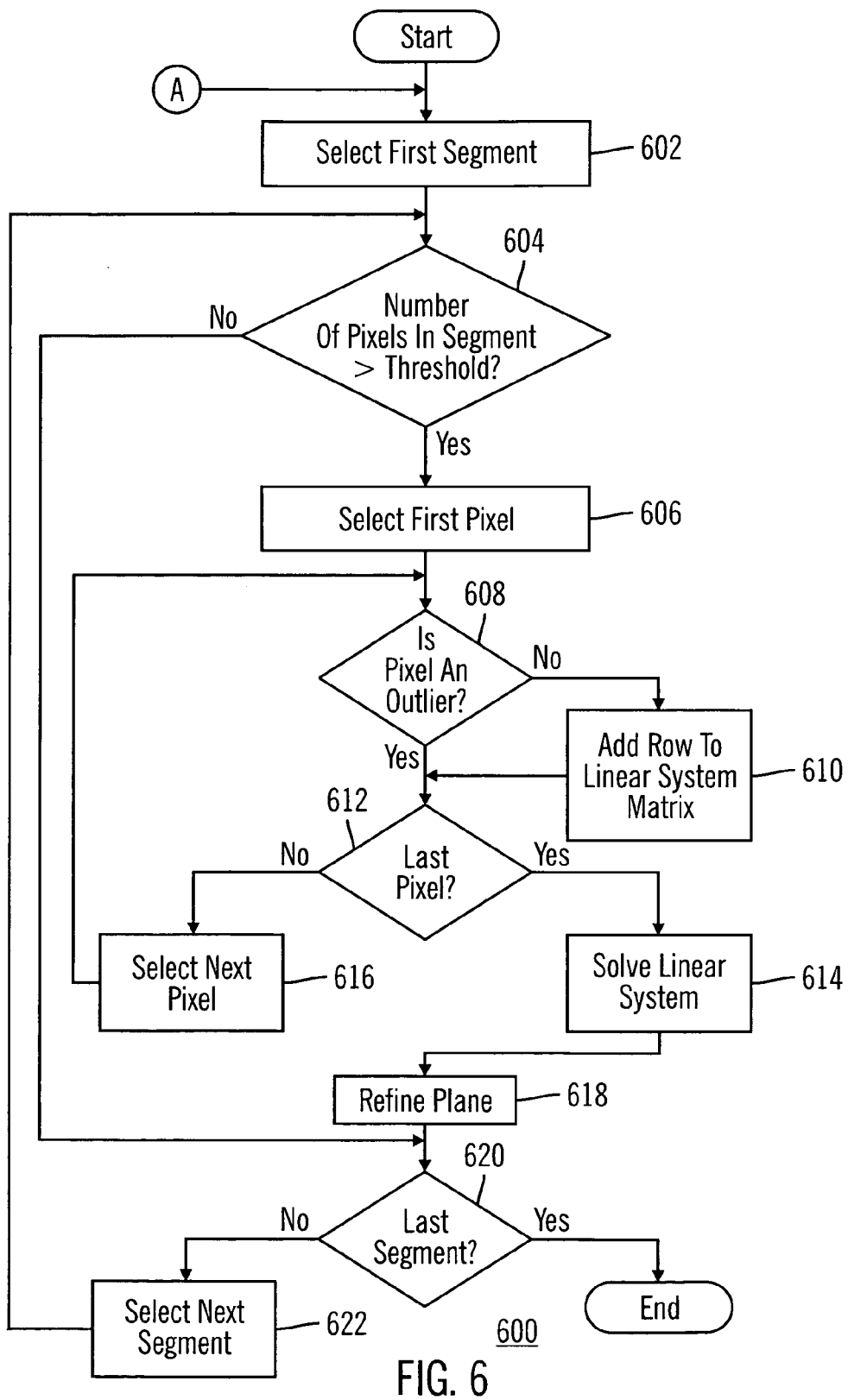
FIG. 6 illustrates a processing flow diagram for disparity plane set determination processing as is performed by an exemplary embodiment of the present invention.

FIG. 6 illustrates a processing flow diagram for disparity plane set determination processing 600 as is performed by an exemplary embodiment of the present invention. The disparity plane set determination processing 600 of the exemplary embodiment processes each identified segment within the reference image of the images stored in image memory 310 to determine a disparity plane set that best fits the determined disparity planes for the segments within the reference image. The disparity plane set determination processing 600 is similar to the define disparity plane set step 406 of the top level processing flow 400.

The disparity plane set determination processing 600 begins by selecting, at step 602, a first image segment within the reference image. The processing then determines, at step 604, if the number of pixels in the selected image segment is greater than a threshold. The exemplary embodiment only processes image segments that are larger than a predetermined threshold, as described above. If the selected image segment is determined to not be larger than the predetermined threshold, the processing advances by determining, at step 620, if this is the last segment to be processed, as described below. If the selected image segment is larger than the predetermined threshold, the processing selects, at step 606, a first pixel in the current image segment. The processing next determines, at step 608, if this selected pixel is an outlier, as described above. If the selected pixel is determined not to be an outlier, the processing adds, at step 610, a row to a linear system matrix that corresponds to the selected pixel. This linear system matrix is used to solve the coefficients for disparity planes that are a best fit for disparity values determined for image segments within the reference image. The processing next determines, at step 612, if this is the last pixel in the current segment. If this is not the last pixel in the current image segment, the processing selects, at step 616, the next pixel in the segment and returns to determine, at step 608, if this newly selected pixel is an outlier. The processing of this newly selected pixel proceeds as described above.

If the pixel being was determined, at step 612, to be the last pixel in the image segment, the processing next solves, at step 614, the linear system that was constructed from non-outlier pixels within the selected image segment. The processing next refines, at step 618, the determined disparity plane as discussed above and described in a processing flow diagram below. The processing next determines, at step 620, if the currently selected image segment is the last image segment to be processed. If the currently selected image segment is not the last image segment to be processed, the processing selects, at step 622, the next image segment to process and returns to determine, at step 604, if the number of pixels in this newly selected image segment is greater than the predetermined threshold. This newly selected image segment is then processed as described above. If the current image segment was determined, at step 620, to be the last segment, the disparity plane set determination processing 600 terminates.

Figure 7:
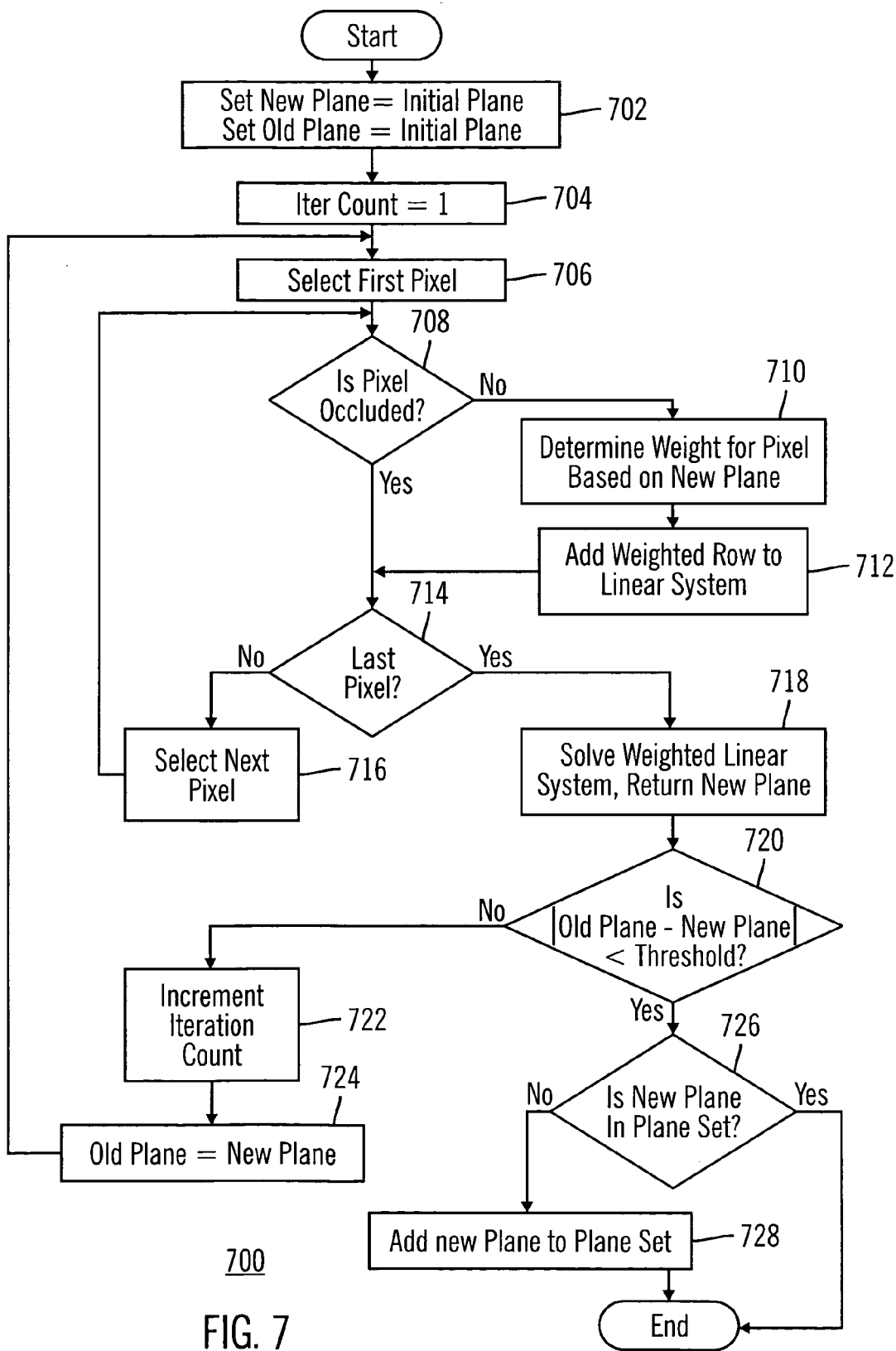
FIG. 7 illustrates a processing flow diagram for a refine disparity plane processing as is performed by an exemplary embodiment of the present invention.

FIG. 7 illustrates a processing flow diagram for a refine disparity plane processing 700 as performed by the exemplary embodiment of the present invention. The refine disparity plane processing 700 corresponds to the refine disparity plane processing step 618 described above for the disparity plane set determination processing 600. The refine disparity plane processing 700 is performed once an initial disparity plane is fitted to an image segment. The exemplary refine disparity plane processing 700 described herein is performed for one image segment at a time since it is performed after an initial disparity plane is fitted to a segment. The refine disparity plane processing 700 of the exemplary embodiment is ultimately performed for all image segments to which disparity planes are fitted.

The refine disparity plane processing 700 performs an iterative plane fitting processing to produce refined disparity planes for image segments within the reference image of the images stored in the image memory 310. This iterative refinement is performed until convergence is observed, or for a maximum number of iterations.

The refine disparity plane processing 700 begins by setting, at step 702, the "new plane" and "old plane" to the initially fitted disparity plane for the current image segment. Disparity planes in this context refer to fitted disparity planes and are represented in the exemplary embodiment by the three coefficients that uniquely define a plane in the two-dimensional space of the stored images. The definition of the initially fitted disparity plane is an input to this function. The exemplary embodiment of the present invention determines the initially fitted disparity plane parameters as described above for the disparity plane set determination processing 600.

The processing then determines improved disparity plane estimates as follows. After initializing the disparity plane values, at step 702, the processing continues by setting, at step 704, the iteration count to 1 and selecting, at step 706, the first pixel of the current image segment. The processing next determines, at step 708, if this selected pixel is occluded. The determination of occluded pixels in the exemplary embodiment is described in detail above. If the currently selected pixel is determined to be occluded, the processing determines, at step 710, a weight for the currently selected pixel based upon the distance between the disparity of the pixel and the corresponding point on the disparity plane defined by the "new plane" coefficients. In this embodiment, the "new plane" is a prior disparity plane estimate. The processing next adds, at step 712, a row to a linear system that includes the determined weight, as described above.

If this pixel was determined to be occluded or after the weighted entry is added to the linear system, the processing determines, at step 714, if the current pixel is the last pixel in this image segment. If this is not the last pixel to be processed, the processing selects, at step 716, the next pixel to be processed and returns to determine, at step 708, if this newly selected pixel is occluded. This newly selected pixel is then processed as described above.

If the pixel was determined to be the last pixel to be processed, the processing advances to solving, at step 718, the weighted linear system constructed by adding weighted rows in step 712. The solution of this weighted linear system produces a set of disparity plane coefficients that are used to define a new value for the "new plane" disparity plane.

The processing then determines if the "new plane" is sufficiently similar to the "old plane" to declare that the iterative disparity plane refinement process has converged. The processing determines, at step 720, if the magnitude of the difference of the "old plane" and the "new plane" is less than a predetermined threshold. If this difference is not below the predetermined threshold, the processing increments, at step 722, the iteration count and sets the coefficients of the "old plane" to the newly calculated value for the "new plane". The processing then returns to selecting, at step 706, the first pixel of the current image segment and reiterates the above described processing.

If the "old plane" and the "new plane" are determined to be sufficiently close that the iterative solution has converged, the processing next determines, at step 726, if the "new plane" is in the composite disparity plane set. If this "new plane" is determined to not be in the composite disparity plane set, the processing adds, at step 728, the "new plane" to the composite disparity plane set. The refine disparity plane processing 700 then terminates.

Figure 8:
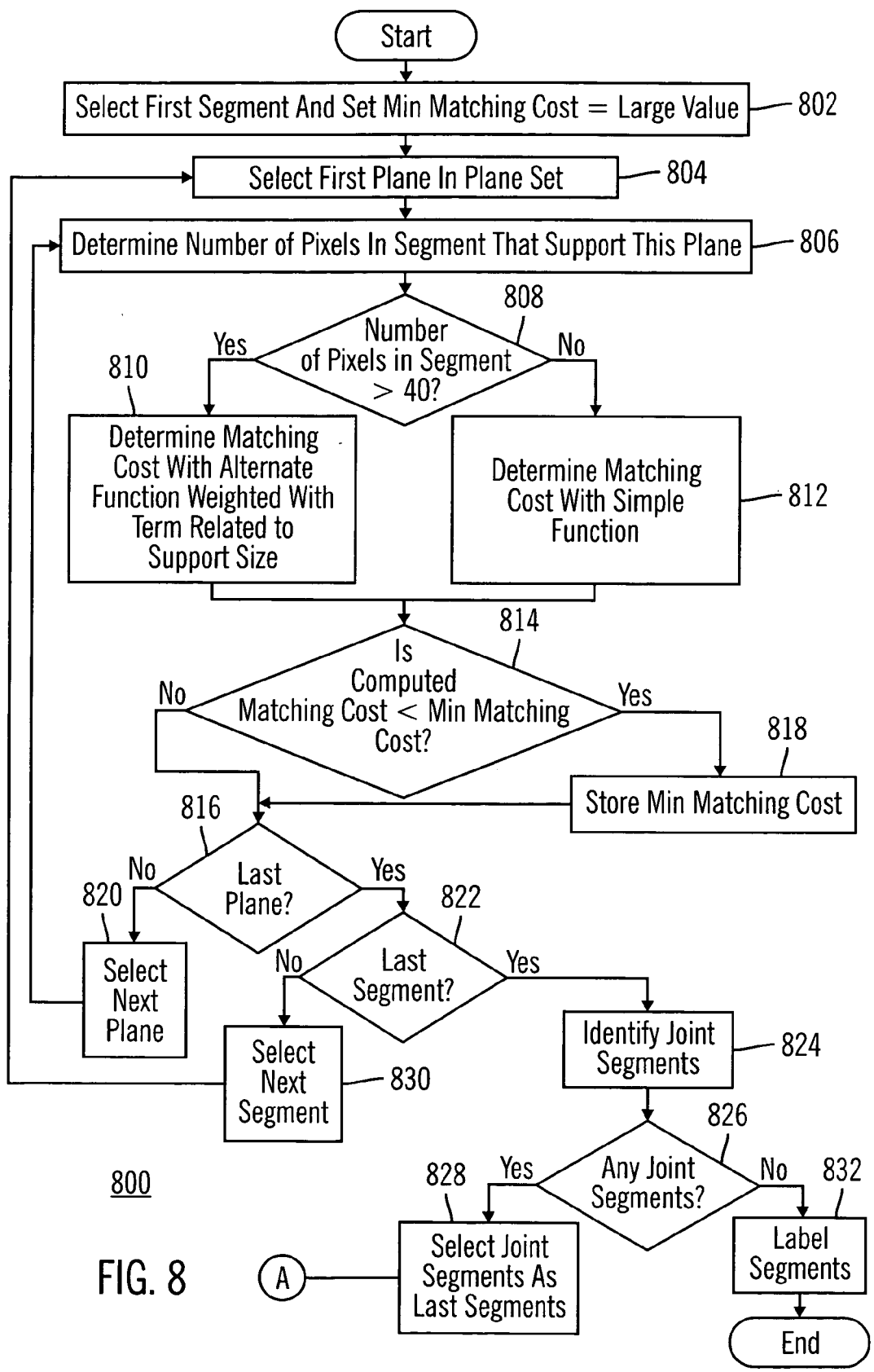
FIG. 8 illustrates a processing flow diagram for an optimize disparity plane processing as is implemented by an exemplary embodiment of the present invention.

FIG. 8 illustrates a processing flow diagram for an optimize disparity plane processing 800 as is implemented by an exemplary embodiment of the present invention. The optimize disparity plane processing 800 is similar to the refine disparity planes and image segment grouping step 408 of the top level processing flow 400.

The exemplary optimize disparity plane processing 800 begins by selecting, at step 802, a first segment and setting a minimum matching cost value to a large value, such as 10,000. The processing next selects, at step 804, a first disparity plane in the composite disparity plane set. The composite disparity plane set was determined by the processing above. The processing then advances to determine, at step 806, the number of pixel in the currently selected image segment that supports the selected disparity plane, as described in detail above.

The optimize disparity plane processing 800 continues by determining, at step 808, if the number of pixels in the currently selected segment is greater than a preset threshold, such as 40 in the exemplary embodiment. If the number of pixels in the currently selected image segment is determined to not be greater than the predetermined threshold, the processing determines, at step 812, a matching cost for the currently selected segment to the currently selected disparity plane by using a simple matching cost function, such as the function defined by equation (7) above. If the number of pixels in the currently selected image segment is determined to be greater than the predetermined threshold, the processing determines, at step 810, a matching cost for the currently selected segment to the currently selected disparity plane by using an alternative matching cost function, such as the function defined by equation (9) above. The alternative cost function of the exemplary embodiment modifies the cost value based upon a term related to the portion of pixels that support the currently selected disparity plane, as was calculated in step 806.

The processing next determines, at step 814, if the computed matching cost is less than the value of the minimum matching cost. If this is true, the newly computed matching cost is stored as a new minimum matching cost. This operates to determine the minimum matching cost for the current image segment relative to each disparity plane in the composite disparity plane set.

The processing next determines, at step 816, if this is the last disparity plane in the composite disparity plane set. If it is not the last disparity plane in the composite disparity plane set, the processing selects, at step 820, the next disparity plane in the disparity plane set and returns to determine, at step 806, the number of pixels in the current image segment that support this newly selected disparity plane. The processing of the current image segment relative to the newly selected disparity plane then continues as described above.

If the disparity plane is determined to be the last disparity plane, the processing then determines if the currently selected image segment is the last image segment to be processed. If this is not the last image segment to be processed, the processing selects, at step 830, the next image segment to process. The processing then returns to selecting, at step 804, the first disparity plane in the composite disparity plane set and continues to process this newly selected image segment as described above.

If the image segment was determined to have been the last image segment to process, the processing advances to identifying, at step 824, neighboring image segments that are assigned to the same disparity plane in order to create conceptual joint segments containing such neighboring segments for further disparity plane refinement. Processing of neighboring joint segments is described above. The processing then determines, at step 826, if there are any joint image segments. If there are any joint segments, these joint image segments are processed as a single segment, as described above with respect to FIGS. 6 and 7. Processing of joint segments continues by returning to selecting, at step 602 of FIG. 6, a first segment within this joint segment. The processing of these joint segments and the newly processed disparity planes then continues in the manner described in FIGS. 6 through 8. If no joint image segments were identified, processing continues by labeling, at step 832, the image segments. The exemplary embodiment labels segments by finding an image segment to disparity plane labeling, $f$, that minimizes the function $E(f)=E_{data}(f)+E_{smooth}(f)$, as described above with specific processing steps described below. The processing for this image then terminates.

Figure 9:
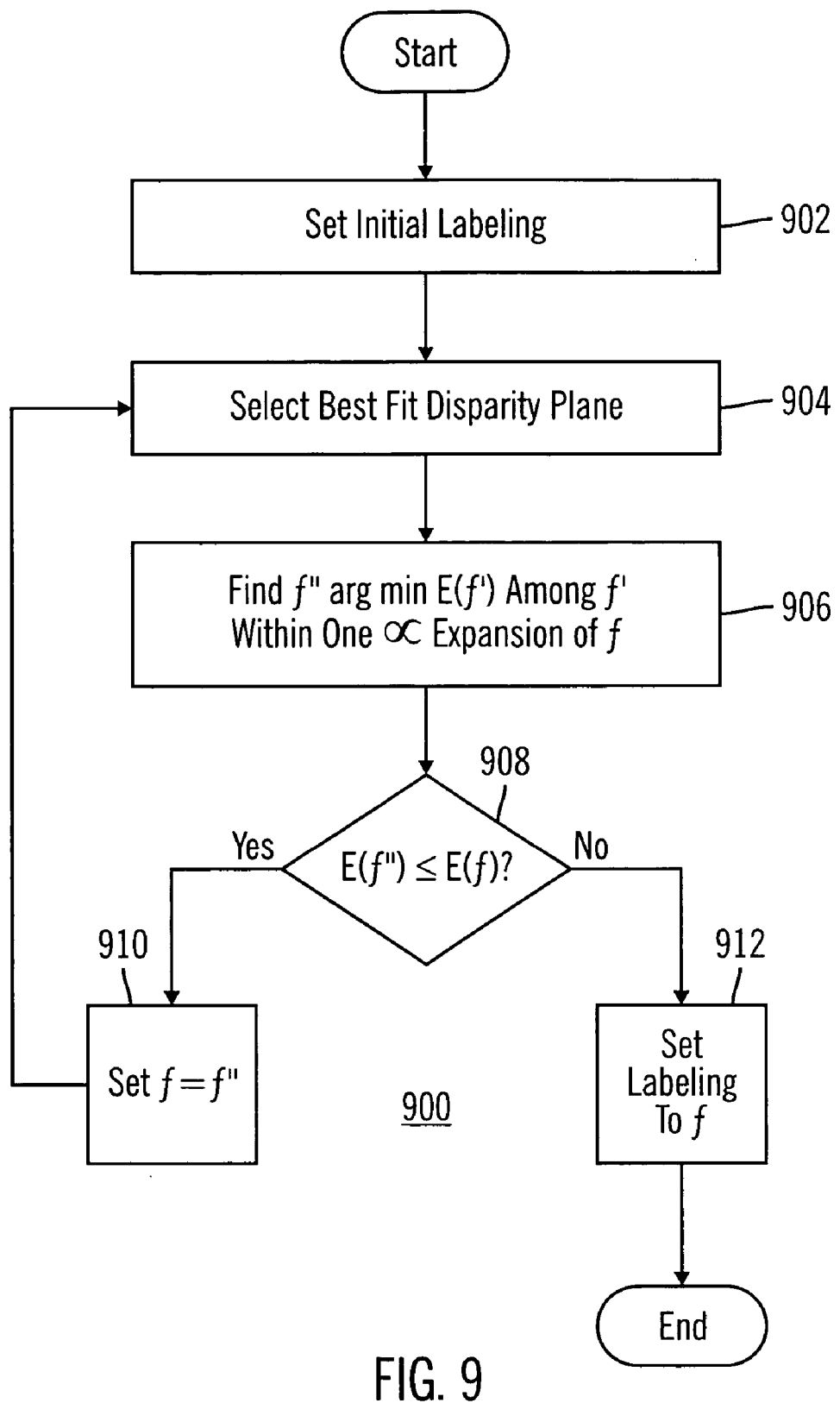
FIG. 9 illustrates a processing flow diagram for a segment labeling using graph cuts processing as is implemented by an exemplary embodiment of the present invention.

FIG. 9 illustrates a processing flow diagram for a segment labeling using graph cuts processing 900 as is implemented by an exemplary embodiment of the present invention. The segment labeling by using graph cuts processing 900 operates to find an optimal segment labeling that assigns identified segments to disparity planes so as to minimize the global energy function $E(f)$ described above. The segment labeling by using graph cuts processing 900 begins by setting, at step 902, an initial segment to disparity plane labeling as was determined based upon the above described processing. The processing continues by selecting, at step 904, an order for the disparity planes within the disparity plane set identified above. Some embodiments of the present invention select this disparity plane ordering to be either a random or a fixed ordering. The processing next finds, at step 906, $f''=\arg\min E(f')$ among $f'$ within one $\alpha$-expansion off. The processing next continues by determining, at step 908, if $E(f'')$ less than or equal to $E(f)$. If $E(f'')$ less than or equal to $E(f)$, the processing sets, at step 910, $f$ equal to $f''$. If $E(f'') \leq E(f)$, the processing sets, at step 912, the determined labeling for the identified segments as $f$, and the processing terminates. This solution usually converges within 2-3 iterations. In addition, it is also extremely insensitive to the selected initial labeling. Further general descriptions of graph cut processing as applied to other areas are described in, for example, V. Kolmogorov and R. Zabih, "Computing visual correspondence with occlusions using graph cuts", Proc. Int'l Conf. Computer Vision 2001, and V. Komogorov and R. Zabih, "What energy functions can be minimized via graph cuts?", Proc. European Conf. Computer vision 2002. The entire contents of these two references are incorporated herein by reference.

The exemplary embodiments of the present invention, as described above, advantageously reduce computational processing resources required to perform stereo image matching while greatly enhancing the robustness and usability of depth determination results for conventionally difficult image portions, such as textureless regions, disparity discontinuous boundaries and occluded portions. The exemplary embodiments of the present invention accomplish these results by formulating the stereo matching problem as a global energy minimization problem in the image segment domain and then utilizing graph cuts to approximate an optimal solution. By working in the segment domain, relatively large numbers of pixels are characterized by the coefficients of an estimated disparity plane that represents depth information for image segments. Working with these plane coefficients greatly reduces computational complexity relative to performing comparable processing in the pixel domain.

The processing of the exemplary embodiments further advantageously performs local optimization first to identify the most possible disparity planes that estimate the depth of each identified image segment, increasing the convergence speed of the global method which is more robust but time consuming. Segments that are estimated by similar planes are associated with one another by being assigned to the same plane. These associated segments, which are represented by the same estimated disparity plane, are then iteratively processed by a linear system to determine a refined disparity plane set to represent portions of an image. The labeling set approach of the exemplary embodiment further advantageously operates to describe the disparity model of the scene instead of quantized disparities.

The exemplary embodiment of the present invention further advantageously improves processing robustness by only processing pixels with reliable initial disparities. The processing of the exemplary embodiment further advantageously increases robustness by including a weighted linear system, as described above. The exemplary embodiment further associates segments that are estimated by similar planes by assigning those segments to the same disparity plane. This advantageously reduces the number of disparity planes used to describe the image, and reduces processing complexity while increasing the robustness of the processing results. The exemplary embodiment advantageously groups neighboring segments that are estimated by the same disparity plane.

The exemplary embodiment further uses a novel matching cost function that considers not only the sum of pixel matching cost, but also the supporting size of the initial pixel disparity in the depth plane.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows a the computer to read data, instructions, messages or message packets, and other computer readable information. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The terms "a" or "an", as used herein, are defined as one or more than one. The term plurality, as used herein, is defined as two or more than two. The term another, as used herein, is defined as at least a second or more. The terms including and having, as used herein, are defined as comprising (i.e., open language). The term coupled, as used herein, is defined as connected, although not necessarily directly, and not necessarily mechanically.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for image matching, the method comprising the steps of:
   determining a first disparity surface by fitting initial disparity values for at least three pixels that are contained within a first segment of a plurality of segments within an image;
   determining a second disparity surface by fitting initial disparity values for at least three pixels that are contained within a second segment within the plurality of segments of the image;
   creating a disparity surface set comprising at least the first disparity surface and the second disparity surface; and
   labeling each segment of the plurality within segments to a respective best fit disparity surface within the disparity surface set by minimizing a labeling efficiency function that globally determines labeling efficiency for each segment with respect to each disparity surface within the disparity surface set.

2. The method according to claim 1, wherein the labeling step is performed using segments within the plurality of segments that have a number of pixels greater than a respective predetermined threshold.

3. The method according to claim 1, wherein the step of determining the first disparity surface comprises the substeps of:
   determining at least one outlying pixel within the at least three pixels that are contained within the first segment by determining a first disparity for a first pixel in the image relative to a corresponding pixel in a second image, and a second disparity calculated for the corresponding pixel relative to the first pixel, the at least one outlying pixel determined by an inequality between the first disparity and the second disparity; and
   excluding the at least one outlying pixel from the at least three pixels.

4. The method according to claim 1, wherein the labeling step comprises the sub-step of labeling a selected segment within the plurality of segments to a respective best fit disparity surface by using a selected minimum cost function chosen from a plurality of minimum cost functions dependent upon a number of pixels in selected segment.

5. The method according to claim 1, further comprising, after the labeling step, the steps of:
   determining if the first disparity surface and the second disparity surface have the same label;
   determining if the first segment and the second segment are adjacent; and
   combining, in response to determining that the first disparity surface and the second disparity surface have the same label and that the first disparity surface is adjacent to the second disparity surface, the first segment and the second segment.

6. The method according to claim 1, further comprising the step of refining the disparity surface set by iteratively refitting the first disparity surface to pixels within the first segment and iteratively refitting the second disparity surface to pixels within the second segment.

7. The method according to claim 6, wherein iteratively refitting the first disparity surface comprises determining an improved disparity surface estimate by fitting the improved disparity surface estimate to the at least three pixels with a weighted linear system function that includes a weighting in the weighted linear system function for each pixel within the at least three pixels, the weighting being dependent upon an a difference between an initial disparity value for the each pixel of the at least three pixels and a prior disparity surface estimate for the first segment.

8. The method according to claim 6, wherein at least one of the determining a first disparity surface, determining a second disparity surface and refining the disparity surface set is performed with segments within the plurality of segments that have a number of pixels greater than a respective predetermined threshold.

9. The method according to claim 6, wherein refining the disparity surface set comprises creating a refined disparity surface set by evaluating a matching cost function between a respective segment and a selected disparity surface within the refined disparity surface set, and the matching cost function comprises a term dependent upon a proportion of supporting pixels in a respective segment for the selected disparity surface.

10. The method according to claim 6, further comprising the steps of:
    determining if the first disparity surface and the second disparity surface are equivalent;
    determining if the first segment and the second segment are adjacent; and
    fitting, in response to determining that the first disparity surface and the second disparity surface are equivalent and that the first disparity surface is adjacent to the second disparity surface, a respective best fit plane to a joint segment comprising the first segment and the second segment.

11. The method according to claim 1, wherein the labeling function operates to reduce disparity surface discontinuities among adjacent segments.

12. The method according to claim 11, wherein the labeling function comprises:

$$E(f) = E_{data}(f) + E_{smooth}(f)$$

where $E_{data}(f)$ comprises a data-dependent energy term containing the cost of assigning disparity plane labels to the segments and $E_{smooth}(f)$ comprises a function to enforce smoothness and that operates to reduce disparity plane discontinuities by penalizing such discontinuities.

13. The method according to claim 12, $$\text{wherein } E_{data}(f) \text{ comprises: } \sum_{S \in R} C(S, f(S)), \text{ and}$$

$$E_{smooth}(f) \text{ comprises } \sum_{S,S'} u_{S,S'} \delta(f(S) \neq f(S')),$$

where S and S' are neighboring segments, R is the plurality of segments, $u_{S,S'}$ is proportional to the common border length between segment S and S', and $\delta(f(S) \neq f(S'))$ has value 1 if $f(S) \neq f(S')$, otherwise 0, and $C(S,f(S))$ is a matching cost function.

14. The method according to claim 13, wherein $C(S,f(S))$ is one of:

$$\sum_{(x,y) \in S-O} c(x, y, d) e^{1-\frac{s}{n}}$$

where O is a set of occluded pixels, s is a number of non-occluded pixels in S, x and y are pixel coordinates and d is a respective initial disparity for pixel (x, y), and n is a number of pixels in S, and $$\sum_{(x,y) \in S} c(x, y, d) \text{ where}$$

$$c(x, y, d) = \frac{1}{9} \sum_{i=-1}^{1} \sum_{j=-1}^{1} |I(x+i, y+j) - J(x+i+d, y+j)|.$$

15. An image matching system, comprising:
a disparity calculator that creates a disparity surface set that comprises at least the first disparity surface and the second disparity surface by determining the first disparity surface by fitting initial disparity values for at least three pixels that are contained within a first segment of a plurality of segments within an image and by determining the second disparity surface of the disparity surface set by fitting initial disparity values for at least three pixels that are contained within a second segment within the plurality of segments of the image; and
a best fit processor that labels each of the plurality of segments within the image to a respective best fit disparity surface within the disparity surface set by minimizing a labeling efficiency function that globally determines labeling efficiency for each segment with respect to each disparity surface within the disparity surface set.

16. The image matching system according to claim 15, wherein the best fit processor labels only segments within the plurality of segments that have a number of pixels greater than a respective predetermined threshold.

17. The image matching system according to claim 15, wherein the best fit processor labels each segment of the plurality of segments by at least labeling a selected segment within the plurality of segments to a respective best fit disparity surface by using a selected minimum cost function chosen from a plurality of minimum cost functions dependent upon a number of pixels in selected segment.

18. The image matching system according to claim 15, further comprising a plane refinement processor that refines the disparity surface set by iteratively refitting the first disparity surface to pixels within the first segment and iteratively refitting the second disparity surface to pixels within the second segment.

19. The image matching system according to claim 18, wherein the plane refinement processor iteratively refits the first disparity surface by at least determining an improved disparity surface estimate by at least fitting the improved disparity surface estimate to the at least three pixels with a weighted linear system function that includes a weighting in the weighted linear system function for each pixel within the at least three pixels, the weighting being dependent upon a difference between an initial disparity value for the each pixel of the at least three pixels and a prior disparity surface estimate for the first segment.

20. The image matching system according to claim 18, wherein segments within the plurality of segments that have a number of pixels greater than a respective predetermined threshold are used by at least one of the disparity calculator to determine a first disparity surface and a second disparity surface, and the plane refinement processor to refine the disparity surface set.

21. The image matching system according to claim 18, wherein the plane refinement processor creates a refined disparity surface set by evaluating a matching cost function between a respective segment and a selected disparity surface within the refined disparity surface set, and the matching cost function comprises a term dependent upon a proportion of supporting pixels in a respective segment for the selected disparity surface.

22. The image matching system according to claim 18, wherein the plane refinement processor further:
determines if the first disparity surface and the second disparity surface are equivalent;
determines if the first segment and the second segment are adjacent; and
fits, in response to determining that the first disparity surface and the second disparity surface are equivalent and that the first disparity surface is adjacent to the second disparity surface, the a respective best fit plane to a joint plane comprising the first disparity surface and the second disparity surface.

23. The image matching system according to claim 15, wherein the labeling efficiency function operates to reduce disparity surface discontinuities among adjacent segments.

24. The image matching system according to claim 23, wherein the labeling efficiency function comprises:

$$E(f) = E_{data}(f) + E_{smooth}(f)$$

where $E_{data}(f)$ comprises a data-dependent energy term containing the cost of assigning disparity plane labels to the segments and $E_{smooth}(f)$ comprises a function to enforce smoothness and that operates to reduce disparity plane discontinuities by penalizing such discontinuities.

25. The method according to claim 24, $$\text{wherein } E_{data}(f) \text{ comprises: } \sum_{S \in R} C(S, f(S)), \text{ and}$$

$$E_{smooth}(f) \text{ comprises } \sum_{S,S'} u_{S,S'} \delta(f(S) \neq f(S')),$$

where S and S' are neighboring segments, R is the plurality of segments, $u_{S,S'}$ is proportional to the common border length between segment S and S', and δ(ƒ(S)≠ƒ(S')) has value 1 if ƒ(S)≠ƒ(S'), otherwise 0, and C(S,ƒ(S)) is a matching cost function.

26. The image matching system according to claim 25, wherein C(S,ƒ(S)) is one of:

$$\sum_{(x,y)\in S-O} c(x, y, d)e^{1-\frac{s}{n}}$$

where O is a set of occluded pixels, s is a number of non-occluded pixels in S, x and y are pixel coordinates and d is a respective initial disparity for pixel (x, y), and n is a number of pixels in S, and $$\sum_{(x,y)\in S} c(x, y, d) \text{ where}$$

$$c(x, y, d) = \frac{1}{9} \sum_{i=-1}^{1} \sum_{j=-1}^{1} |I(x+i, y+j) - J(x+i+d, y+j)|.$$

27. A computer program product encoded with machine readable instructions for image matching, the machine readable instructions comprising instructions for:
   determining a first disparity surface by fitting initial disparity values for at least three pixels that are contained within a first segment of a plurality of segments within an image;
   determining a second disparity surface by fitting initial disparity values for at least three pixels that are contained within a second segment within the plurality of segments of the image;
   creating a disparity surface set comprising at least the first disparity surface and the second disparity surface; and
   labeling each segment of the plurality within segments to a respective best fit disparity surface within the disparity surface set by minimizing a labeling efficiency function that globally determines labeling efficiency for each segment with respect to each disparity surface within the disparity surface set.

28. The computer program product according to claim 27, wherein the instructions for labeling comprise instructions for labeling each segment of the plurality of segments to a respective best fit disparity surface is performed with segments within the plurality of segments that have a number of pixels greater than a respective predetermined threshold.

29. The computer program product according to claim 27, further comprising instructions for refining the disparity surface set by iteratively refitting the first disparity surface to pixels within the first segment and iteratively refitting the second disparity surface to pixels within the second segment.

30. The computer program product according to claim 29, wherein the instructions for iteratively refitting the first disparity surface comprises instructions for determining an improved disparity surface estimate by fitting the improved disparity surface estimate to the at least three pixels with a weighted linear system function that includes a weighting in the weighted linear system function for each pixel within the at least three pixels, the weighting being dependent upon an a difference between an initial disparity value for the each pixel of the at least three pixels and a prior disparity surface estimate for the first segment.

* * * * *